Mar. 27, 1923.
C. F. HAUNZ
VALVE FOR CORROSIVE LIQUIDS
Filed Nov. 26, 1920
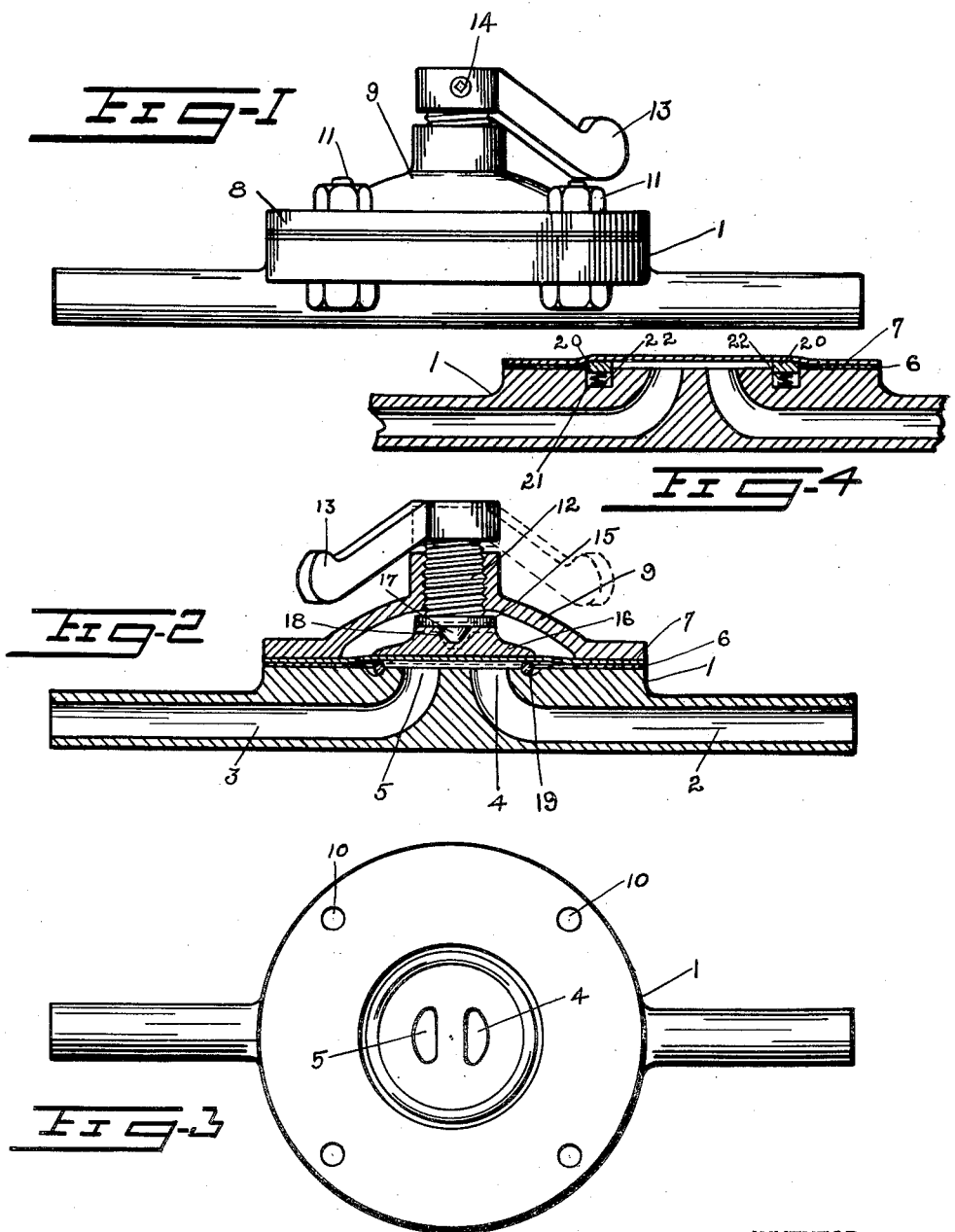

Patented Mar. 27, 1923.

1,450,078

UNITED STATES PATENT OFFICE.

CHARLES F. HAUNZ, OF BUFFALO, NEW YORK, ASSIGNOR OF ONE-HALF TO THEODORE KRUG, OF BUFFALO, NEW YORK.

VALVE FOR CORROSIVE LIQUIDS.

Application filed November 26, 1920. Serial No. 426,465.

*To all whom it may concern:*

Be it known that I, CHARLES F. HAUNZ, a citizen of the United States, residing at Buffalo, in the county of Erie and State of New York, have invented certain new and useful Improvements in Valves for Corrosive Liquids, of which the following is a specification.

The object of this invention is to provide a new and improved form of valve which is especially adapted for use in pipe lines conveying corrosive liquids.

Another object of this invention is to provide a valve which is simple in construction and made up with a minimum cost in the manufacture thereof.

These and other objects of this invention will be fully illustrated in the drawing, described in the specification and pointed out in the claims at the end thereof.

In the accompanying drawing:

Fig. 1 is a side elevation of the valve.

Fig. 2 is a vertical, longitudinal cross section of the valve.

Fig. 3 is a top plan view of the casing and seat of the valve with the diaphragm, dome and operating lever removed therefrom.

Fig. 4 is a detail sectional view of the base of the valve with a modified form of lifting ring mounted in the top of the base.

In the several figures of the drawing, like reference numerals indicate like parts.

The valve shown in the drawing is made up of the casing or base 1, which has a portion disk shaped, and has the ducts 2 and 3, leading from both sides toward the center thereof. Near the center of the base 1, the ducts 2 and 3 are curved upwardly and terminate in the ports 4 and 5, respectively, in the horizontal seat of the base 1.

Placed on top of the seat of the base 1 is a ring gasket 6 which is made of metal or other suitable material having an outside diameter equal to that of the base 1 and an inside diameter large enough to form a shallow pocket with the seat of the base in which the ports 4 and 5 are located. On top of the gasket 6 is placed a diaphragm 7 which is made up of flexible material such as sheet metal, glass or hard rubber. This diaphragm covers the shallow pocket formed by the gasket 6 and bridges the ports 4 and 5 provided therein.

The diaphragm 7 and gasket 6 are clamped to the base 1 by the flange 8 of the dome 9. This flange is provided with a series of holes, which are adapted to register with similar holes 10, 10, in the base 1. Bolts 11 are adapted to pass thru these holes which when tightened firmly clamp the dome 9, diaphragm 7 and gasket 6 onto the base making a tight joint between all of these parts. The dome 9 has a lead screw 12 mounted in the top thereof and this screw is provided on the outside with the lever 13 which is suitably fastened thereto by means of the set screw 14. On the lower end of the lead screw 12 is provided the collar 15 which forms a stop for the lead screw so that it cannot be screwed out of the dome. The lead screw moves only a limited distance sufficient to force the diaphragm 7 down on the seat to close the port openings 4 and 5 when moved in one direction and permitting the diaphragm to raise from the seat and uncover the port openings when moved in the other direction. When the port openings are closed by the diaphragm, the flow of the liquid is stopped thereby. When the screw is turned up, the force of the liquid is sufficient to raise the diaphragm and starts the flow.

For the purpose of forcing the diaphragm into the shallow pocket, a presser foot 16 is placed below the collar of the lead screw 12. A tapered center pin 17 formed on the under side of the collar 15 is adapted to project into a corresponding depression 18 formed in the top of the presser foot 16 and holds the presser foot centrally of the dome 9 and the diaphragm 7.

The presser foot 16 has a flat surface at the bottom with which it rests on the diaphragm so that it can be forced evenly into the shallow pocket formed by the gasket 6 and onto the seat of the casing to close both of the openings 4 and 5.

For the purpose of assisting the force of the fluid in lifting the diaphragm 7 off from the seat of the base to uncover the openings 4 and 5 on the release of the presser foot by the lead screw, an expanding or lifting ring 19 is mounted in the seat of the base concentric to the perimeter of the presser foot 16. This ring slightly projects from the seat of the base and normally holds the diaphragm off from the seat in order to keep the openings 4 and 5 open in the seat. The liquid passing into one of the ducts is thus allowed to enter into the shallow pocket formed by the gasket 6 and closed at the top by the diaphragm 7 and then passes out thru the adjacent opening into the duct leading out therefrom. The depth of the shallow pocket is made so that it will not be smaller in area than one of the openings 4 and 5 in order to permit an unobstructed flow of the liquid from one of the openings to the other.

In Fig. 4 is shown a modification of the expanding or lifting ring 19. In this modification the expanding or lifting ring comprises a metal ring 20 which is mounted in the groove 21. Springs 22 are provided in this groove below the ring 20 and these springs force the ring 20 upwardly in order to lift the diaphragm when the presser foot is released by its lead screw.

When the valve is used for sulphuric acid, the base and gasket are made preferably of lead and the diaphragm is made of hard rubber. The acid will not affect either of these materials and the valve can, therefore, be used a long time as these materials constitute the only parts of the valve with which the acid comes into contact. The other parts of the valve may be made of brass or other suitable materials, it being understood that the acid does not come into contact with them. For other liquids lead and rubber may also be used or other materials may be substituted therefor, depending on the characteristics of the liquid.

I claim:

1. An acid resisting valve comprising a base, having port openings therein, a hard flexible diaphragm mounted above said base and the port openings therein, and means to force said diaphragm against said base to close the port openings therein.

2. An acid resisting valve comprising a base having port openings therein, a hard flexible diaphragm suspended over the openings in said base, a ring mounted in and surrounding the openings in said base and normally holding the diaphragm spaced from the portion of the base surrounding said openings, and means to force said diaphragm against said portion of the base to close the openings therein.

3. An acid resisting valve comprising a base having port openings therein, a ring washer supported on said base, a hard flexible diaphragm supported on said ring washer and bridging over the exposed section of said base containing said port openings, a presser foot located on top of said diaphragm, and means capable to depress said diaphragm into the opening of said ring washer and on top of said base to cover the port openings therein.

4. An acid resisting valve comprising a base having port openings therein, a shallow pocket formed in said base with the port openings of said base located therein, a hard flexible diaphragm placed over said shallow pocket, and means capable of forcing said diaphragm into said shallow pocket to close the port openings located therein.

5. An acid resisting valve comprising a base having port openings therein, a pocket formed in said base with the port openings of said base located therein, a hard flexible diaphragm placed over said pocket, a dome mounted above said diaphragm and clamped to said base and means in said dome to force said diaphragm into said pocket to close the port openings located therein.

6. An acid resisting valve comprising a base having port openings therein, a pocket formed in said base with the port openings thereof located therein, a hard flexible diaphragm placed over said pocket, a dome clamped to said base above said diaphragm, a lead screw mounted in said dome, a presser foot placed between said lead screw and said diaphragm, a lever keyed to the lead screw on the outside of said dome, said lever being adapted to operate said lead screw to open and close said valve.

7. An acid resisting valve comprising a base, having segmental port openings therein, a hard flexible diaphragm mounted above said base and the port openings therein and overlapping said openings and means to force said diaphragm against said base to close the port openings therein.

8. An acid resisting valve comprising a base having a plane surface with segmental port openings therein, a gasket surrounding said surface, a hard flexible plane diaphragm supported on said gasket, means to spring said diaphragm down on said surface and close said openings.

9. An acid resisting valve comprising a lead base, having a plane surface with segmental port openings therein, a gasket surrounding said surface, a plane flexible hard rubber diaphragm supported on said gasket, means to spring said diaphragm down on said surface and close said openings.

10. An acid resisting valve comprising a base having segmental port openings therein, placed close together in a relatively small circle, a hard flexible diaphragm mounted above said base and the port openings, said diaphragm having a large area exposed all around said port openings.

11. An acid resisting valve comprising a base having port openings therein, a hard flexible diaphragm mounted above said base and the port openings therein, a presser foot above said diaphragm, a screw for forcing said presser foot, said foot and said screw having a universal joint between them.

In testimony whereof I affix my signature.

CHARLES F. HAUNZ.